United States Patent [19]
Lloyd et al.

[11] Patent Number: 5,741,343
[45] Date of Patent: Apr. 21, 1998

[54] ADJUSTABLE HOT GLASS TRANSFER DEVICE

[75] Inventors: Patrick H. Lloyd, Decatur; Jeff R. Long, Keller; Timothy A. Stover, Ponder; Steven Richard Hubbard, Decatur; Michael E. Easley, Terrin, all of Tex.

[73] Assignee: Union Oil Company of California, El Segundo, Calif.

[21] Appl. No.: 508,646

[22] Filed: Jul. 28, 1995

[51] Int. Cl.$^6$ .............. C03B 9/04; C03B 9/44; C03B 11/00; C03B 13/00
[52] U.S. Cl. .............. 65/260; 65/239; 65/241; 198/429; 198/432; 198/468.01
[58] Field of Search ............ 65/260, 239, 241; 414/198; 198/429, 432, 468.01, 747, 749

[56] References Cited

U.S. PATENT DOCUMENTS

| | | | |
|---|---|---|---|
| 3,987,889 | 10/1976 | Godoy | 198/456 |
| 4,411,353 | 10/1983 | McDole | 198/425 |
| 5,238,347 | 8/1993 | James | 414/165 |
| 5,324,340 | 6/1994 | Withrow et al. | 65/260 |
| 5,472,077 | 12/1995 | Bolin | 198/430 |

OTHER PUBLICATIONS

*Ware Transfer Products, Glass Production Technology International 1995*, 1994, p. 73.

Tucker, David, "*Automatic Lehr Loading,*" *Glass Production Technology International 1994*, 1994, pp. 145, 146 and 148.

Stewart, Dan and Jakes, Jerry, "*A Systems Approach to Hot Glass Handling,*" *Glass Production Technology International 1992*, 1992, pp. 141-143.

Stewart, D. R. and Jakes, G. A., "*Specialization Comes to Hot Glass Handling,*" *Glass Industry*, Apr. 1989, pp. 20-22.

"Cerberite Hot Glass Handling Materials and Systems," Johnson Radley Limited, 1989, data sheets 0701/4, 0706/2, 0706A, 0706B, 0707/1, 0708/1, 0709, 0710, and 0711.

*Primary Examiner*—Donald E. Czaja
*Assistant Examiner*—Jacqueline A. Ruller
*Attorney, Agent, or Firm*—William O. Jacobson; Yale S. Finkle; Gregory F. Wirzbicki

[57] ABSTRACT

Repositionable stacker bar pads composed of a relatively high-strength nonmetallic material have tongue-in-groove adjoining surfaces and glass-contact surfaces which are roughsned or serrated. The high strength material and overlapping tongue-in-groove "footprint" allows rigid and reliable attachment to a metal support structure. The rough finish of the glass-contact surface minimizes thermal checking and other hot-glass article problems.

37 Claims, 3 Drawing Sheets

5,741,343

ADJUSTABLE HOT GLASS TRANSFER DEVICE

REFERENCE TO RELATED APPLICATIONS, INCORPORATION BY REFERENCE

This application is related to copending application Ser. No. 08/234,936, filed on Apr. 28, 1994, now abandoned which is related to application Ser. No. 07/906,704, filed Jun. 30, 1992, and issued as U.S. Pat. No. 5,324,340 on Jun. 28, 1994. These prior filed applications are incorporated in their entirety herein by reference.

1. Field of the Invention

This invention generally relates to the field of manufacturing glass articles. More specifically, the invention relates to equipment used for transferring hot glass articles after their formation but before their annealing.

2. Background of the Invention

To fabricate a glass article, a mass of molten glass is typically blown into a mold, partially cooled to about 600° C., and the resultant hot glass article transferred to a lehr or annealing oven. During transfer to the annealing oven, the hot glass articles are extremely fragile and susceptible to thermal and physical stress, contamination, and other damage. In addition, annealing or other post-forming process steps may not fully remove added stress concentrations or risers and other defects in the hot glass articles caused by the handling fixtures or transfer equipment.

Any fixtures or equipment touched by hot unannealed glass articles should be made of materials that will minimize stress concentration, contamination, deformation, cracking, or checking of the hot glass. Furthermore, the materials used to handle the hot glass articles must themselves be able to withstand the high temperature contact with the hot glass articles and be rigid enough to insure proper alignment/placement of the articles within the annealing oven.

Stainless steel and other high temperature metal alloys have been used for the body or support structure of fixtures which handle hot glass articles, but metallic materials can cause thermal and/or physical damage if they contact hot glass articles. Therefore, various nonmetallic contact materials have typically been incorporated into fixture designs as removable inserts, pads, or spacers for contacting the hot glass articles, e.g., fabric cloth coverings (such as Apalon or other cloth capable of withstanding high temperatures) or asbestos, plastics, and graphite containing pads attached to a steel support bar. However, the use of these nonmetallic materials presents drawbacks to glass manufacturers.

Although asbestos may have very good thermal and physical properties for this application, its use creates grave environmental and workplace safety concerns. Plastics are generally less well suited for this high temperature application and typically have a relatively short service life even when specially formulated to withstand the high temperatures encountered in this hot end process. Graphite may be more of an ideal nonmetallic material for handling hot glass since graphite has resistance to oxidation at temperatures typically encountered when contacting hot glass articles, nonabrasive surface integrity, and acceptable heat resistance. It is also safe for the environment and to those who work with it.

However, graphite presents several problems that must be overcome before it can be economically used as a material for handling hot glass articles. One problem graphite presents is that it is relatively brittle and therefore can chip or crack or be otherwise mechanically damaged. Another problem frequently encountered with graphite is the difficulty in removably attaching a graphite contact pad to the supporting body of a fixture. Since graphite can wear during use, the graphite contact material should be readily removable. However, removability can result in the attachment to the supporting structure not holding the graphite rigidly and reliably during glass production. Another problem is the need to economically provide an array of graphite contact pads in different shapes and sizes to handle different shapes and sizes of hot glass articles, e.g., the need for machinability.

One specific device for handling hot gas articles is a stacker bar assembly which typically uses nonmetallic pads. Such an assembly is typically used to transfer glassware from a narrow, single line conveyer, known as a cross conveyor, across a transfer plate to a multi-line lehr conveyor. The stacker bar assembly may impart motion in several directions, e.g., to properly space hot glass articles in the oven as well as push the articles into the oven.

A typical stacker bar assembly is composed of a steel support, e.g., in the form of tubing, and a glass contact surface, e.g., attached fabric or carbon-based pads. The assembly typically forms sawtooth or other "pockets" for a particular shape and size of glassware. Thus, many stacker bar assemblies are required to handle the needs of a typical glassware manufacturing facility producing different shapes and sizes of glass articles.

Handling and other problems resulting from graphite's brittleness and relatively short life (when compared to high temperature metallic components), difficulties in rigidly attaching a brittle, low strength material to the steel support, and machining difficulties make graphite, composite graphite, and other carbon materials difficult to use as a contact material in stacker bar assemblies. Graphite or carbon materials can be combined with plastic resins or fibers, but resins and reinforcing fibers create new problems. The resins typically have limited thermal capability, and fiber reinforced compositions are typically not easily machinable, making fabrication of some complex shapes difficult if not impossible. Frequent removal of pads to adapt to different glass articles sizes also increases the risk of damage.

SUMMARY OF THE INVENTION

Such stacker bar assembly and graphite problems are avoided in the present invention by providing repositionable pads composed of a relatively high-strength ceramic and having tongue-in-groove and/or roughened glass-contact surfaces. The strength of the ceramic and the overlapping tongue-in-groove "footprint" allows rigid and reliable attachment to a metal support structure. Adjoining tongue-in-groove shapes form an adjustable contact surface capable of cradling a plurality of various glass article sizes without damage or full detachment/replacement of pads. A roughened or serrated glass-contact surface also minimizes damage to the hot-glass articles.

BRIEF DESCRIPTION OF THE DRAWINGS

FIG. 2A shows an orthogonal and sectioned view of an alternative graphite pad having a different means for attaching.

In these Figures, it is to be understood that like reference numerals refer to like elements or features.

DETAILED DESCRIPTION OF THE INVENTION

Figure 1:
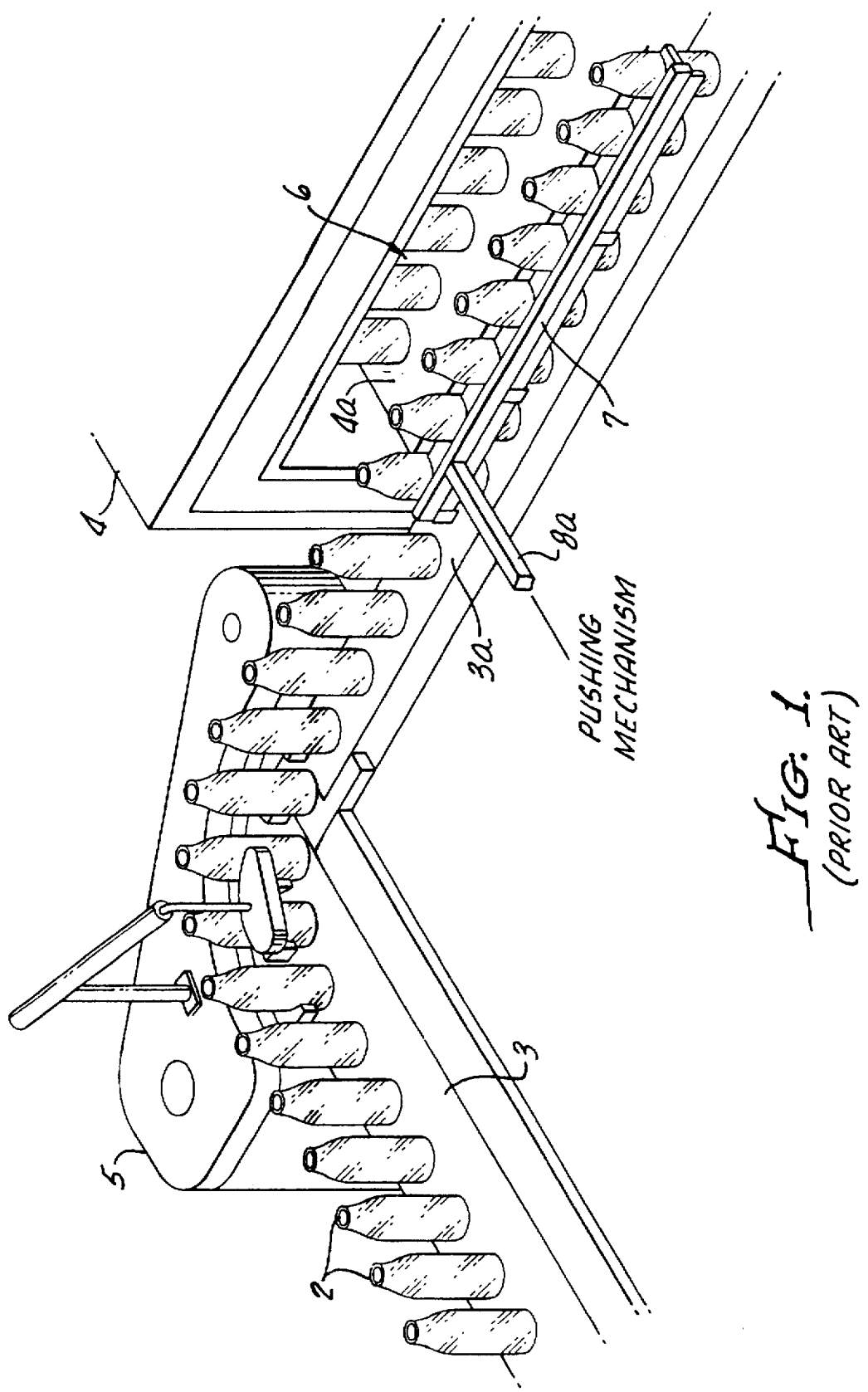
FIG. 1 shows an orthogonal view of a portion of prior art equipment used to fabricate glass.

FIG. 1 shows a hot-end equipment portion of a prior art glass article manufacturing process. Molded hot-glass articles 2 (molding and mold transfer equipment not shown for clarity) are transferred by a single line conveyor 3 and a cross conveyor 3a toward an annealing or lehr oven 4 which removes stresses produced during the glass molding process. In the configuration shown, hot glass articles 2 are transferred from the single line conveyor 3 to the cross conveyor 3a by a transfer unit 5 which may change the spacing between hot glass articles 2. Near the oven entry port 6, a stacker or lehr push bar assembly 7 pushes a plurality of hot-glass articles from the cross conveyor 3a to the multi-line or lehr conveyor 4a which moves the hot-glass articles through the lehr oven 4.

Various conventional pushing mechanisms (not shown for clarity) or other means for pushing the stacker bar assembly 7 can be used. These means can include hydraulic actuators, pneumatic cylinders, electrical actuators, magnetic actuators, and manual operators. Although a single connector portion 8a of the stacker bar assembly 7 extending toward a pushing mechanism is shown, the stacker bar assembly may be directly pushed or actuated without a connector portion. Alternatively, multiple connector portions and/or pushing mechanisms may be used instead of the single connector portion 8a shown.

Figure 2:
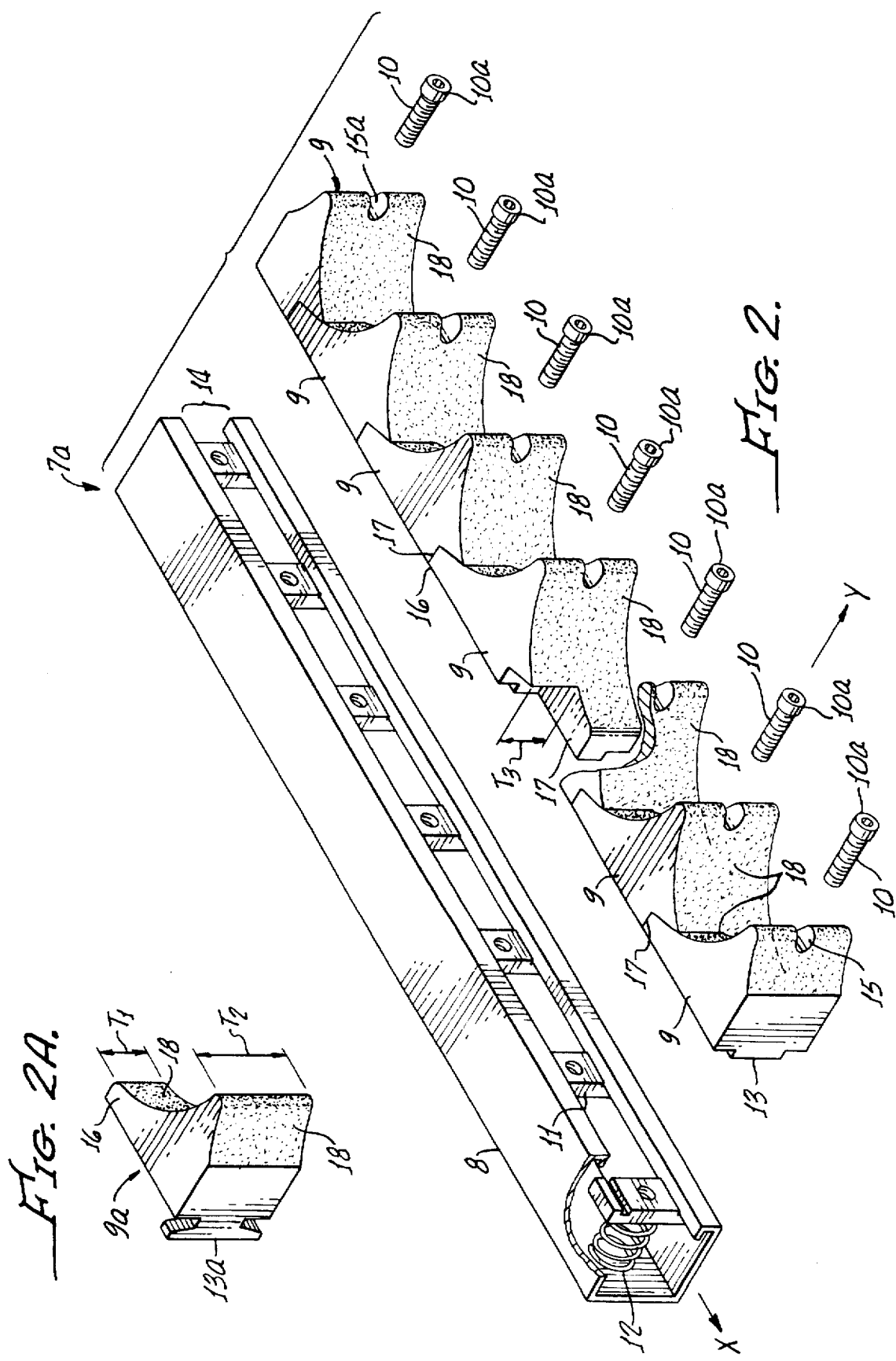
FIG. 2 shows an orthogonal exploded and partial cutaway view of a stacker bar assembly incorporating the invention.

FIG. 2 shows an exploded orthogonal view (with a partial cutaway) of a preferred embodiment of a stacker bar assembly 7a which incorporates the present invention. The stacker bar assembly 7a comprises a support member 8, a plurality of glass-contacting pads or inserts 9, and means for slidably attaching the pads 9 to the support member 8, the specific means for attaching shown as a plurality of bolts 10, nuts 11, and spring retainers 12. The bolts 10 pass through a bolt passageway or counterbore 15 with the bolthead contacting a pad 9 and the threaded portion mating with a nut 11 retained within the support member 8 to allow slidable attachment of the pad to the support. Alternatively, a spring washer could be placed proximate to the bolthead 10a and counterbore 15, also allowing slidable attachment.

The support member 8 is typically composed of a metallic material for strength and rigidity, preferably steel. In the preferred embodiment shown, the support member 8 is derived from a length of square steel tubing or channel member, most preferably electrical construction tubing or metal framing supplied by Unistrut Company located in Wayne, Mich., under the trademark "Unistrut." Other support members may also be used including angle iron, slotted metal plate, box beam, and steel bar, e.g., using repositionable pads having set screws and a hole drilled through the pads slidably contacting the steel bar. In an alternative embodiment, metal conduit is used for forming the support member 8, the conduit being capable of substantially containing a flow of a cooling fluid (e.g., ambient air) within the conduit and/or directing the flow towards the hot-glass articles.

A preferred embodiment of the support member 8 includes a slot 14 having an axis x generally perpendicular to the pushing direction y. The slot 14 allows the pads 9 to be slidably translated along the x axis and repositioned to contact hot glass articles having different shapes and sizes. Repositioning allows different center-to-center spacing and contact angles for similarly sized hot glass articles as well as handling different diameter articles.

Although conventional attaching means may be used, the preferred attaching means or hardware is a plurality of bolts 10, nuts 11, and spring retainers 12 specifically designed to interface with the slot 14 in support member 8. The preferred attaching hardware is supplied with the preferred support member 8, e.g., frame attaching hardware supplied by Unistrut Company. For the preferred configuration, nominal ¼ inch diameter bolts 10 mate with grooved nuts 11 which are retained by bias elements or retainers 12. The bolts 10 are tightened to within a range of about 72–96 in-lbs of torque to reliably secure the pads 9 to support member 8, but lesser or greater amounts of torques may also be used.

An alignment protrusion or support connection surface 13 of pads 9 is shaped and dimensioned to interface with slot 14 of support member 8 and provide rotational rigidity and support in addition to the support provided by the means for attaching. The pad port or bolt passageway 15 shown includes a ledge (not shown in the drawings) 15a for mating with the bolthead portion 10a of bolt 10. In addition (but not shown in FIG. 2), washers, spacers, lock washers, and additional springs may also be included in the attaching means. Still other alternative repositionable attaching means are also possible, including clamps, spring clips, and magnetic couplings.

The preferred pad 9 includes a tongue portion 16 forming part of the contact surface 18. A groove 17 on pad 9 is shaped and dimensioned to accept a tongue 16 from an adjoining pad and form an adjustable tongue-in-groove assembly. Although the tongue portion 16 may have a thickness $T_1$ (see FIG. 2A) equal to the total thickness $T_2$ (see FIG. 2A) of the pad 9, the preferred thickness $T_3$ of a groove 17 on one pad 9 is less than $T_2$ and is shown in FIG. 2 with the adjoining tongue cut away for clarity. The preferred configuration allows each pad to have a tongue portion 16 and a groove 17 on one side and another tongue portion 16 and groove 17 on opposite ends of pad 9, the groove and tongue portions being in reversed positions at opposite ends.

The tongue-in-groove design provides additional strength and rigidity when compared to previous stacker bar assemblies. The extended length of the support surface 13 on tongue 16 and groove portions 17 (achieving overlapping "footprints" of the pads on support 8) within the supporting member slot 14 and the typically slidably supporting contact between adjoining tongue portions and grooves provide this added strength, rigidity, and resistance to breakage. In addition, the tongue-in-groove interfaces provide an added resistance to heat transfer.

A sectioned orthogonal view of an alternate pad 9a is shown in FIG. 2A. The alternate pad 9a has an alternate means for attaching or protrusion 13a which avoids the need for bolts, nuts, or springs. The alternative pad 9a comprises a contact surface 18, an alternative aligning and securing protrusion 13a and a tongue portion 16. The alternative protrusion or support connection interface 13a allows the pad 9a to be installed into slot 14 (see FIG. 2) by positioning the tongue 16 perpendicular to the X axis of slot 14 and rotating the pad clockwise to align the tongue portion 16 substantially parallel to the axis X, securing the alternative pad 9a to support member 8. To adjust the location of the pad 9a, it can be rotated counterclockwise to unsecure, translated generally parallel to the axis x, and rotated clockwise to resecure the pad.

The tongue portions 16 and grooves 17 (shown in FIG. 2) of the pads 9 may also be further interconnected or interlocking for additional rigidity and support. Interlocking may be provided by separate locking hardware and mechanisms, such as clamps, threaded fasteners, or pins. An interlocking configuration can also be provided by alternative pads having two tongues in an alternating pattern with pads having two grooves or an alternating pattern of clockwise-only securing and counterclockwise-only securing pads.

The thickness $T_1$ of tongue 16 as shown on FIG. 2a is typically equal to groove thickness $T_3$ (similar to that shown in FIG. 2) and about one half the total thickness $T_2$ of alternative pad 9a, but alternative tongue and groove thicknesses are also possible. The tongue thickness $T_1$ of tongue portion 16 can range from 0 to 100 percent of total thickness $T_2$, but is preferably in the range from about 40 to 60 percent of total thickness $T_2$. Groove thickness $T_3$ of groove 17 (see FIG. 2) can also range from 0 to 100 percent of total thickness $T_2$, but is preferably in the range from about 40 to 60 percent of total thickness $T_2$.

Returning to FIG. 2, generally manual means for repositioning the pads 9 is preferred, e.g., manual loosening of bolts, sliding pads, and tightening of bolts. However, other nonmanual means for repositioning are also possible. These other repositioning means include hydraulic actuators, pneumatic positioners, and remotely operated mechanical levers. Although the preferred means for repositioning allows continuous adjustability of the pads 9 on support 8, alternative attachment means and repositioning means may only allow a plurality of discrete adjustable locations of the attached pads.

Adjoining contact surfaces 18 of pads 9 (including tongue 16 and groove 17 portions) interact to form a mosaic or multi-element surface for contacting hot glass articles. The multi-element surface forms glassware pockets which contact a plurality of hot glass articles as they are pushed into the lehr oven 4 (as shown in FIG. 1) with minimal thermal and mechanical damage. Because at least one of the pads 9 is usually repositionable and normally in slidable contact with the support member 8, the multi-element surface for contacting can also be continuously adjustable to handle various shapes and sizes of hot glass articles.

The pads 9 are preferably composed of a ceramic material, more preferably a tough grade of graphite, which is normally substantially free of plastic or other nonmetallic resins or fibers. Most preferably, pads 9 are composed of a CXT grade of graphite supplied by Poco Graphite Company, located in Decatur, Tex. The CXT grade of graphite has the following properties: a range of coefficients of thermal expansion of about $7.0-8.0 \times 10^{-6}$ per ° C., a minimum compressive strength of about 10,900 psi, and a minimum flexural strength of about 5,000 psi. However, alternative pad materials of construction may have a minimum compressive strength of 10,000 psi or less and a minimum flexural strength of 4,000 psi or less. More preferred is a compressive strength of about 12,000 psi or higher and a minimum frexural strength of about 6,000 psi or higher. A specific alternative material of construction is a GM-LT grade of graphite supplied by Poco Graphite Company. Other relatively high-strength graphites may also be used, such as Glassmate supplied by Poco Graphite Company. The preferred materials of construction allow a typical stacker bar assembly (similar to that shown in FIG. 2) to weigh a total of about 25.5 pounds compared to a conventional sawtooth stacker bar assembly which is composed of steel and weighs about 55 pounds.

The contact surfaces 18 of pads 9 are preferably arcuate in order to improve the glass article containment characteristics of the stacker bar assembly. Although a constant curvature across the thickness $T_2$ of the pad is preferred for substantially cylindrical hot glass articles such as typical bottles, alternative contact surface shapes are also possible. Alternative contact surface shapes may include planar surface portions (forming an adjustable and interacting sawtooth pattern when adjoining pads are secured to the support member 8) or more complex shapes, e.g., to provide added contact surfaces for noncylindrical hot glass articles.

Figure 3:
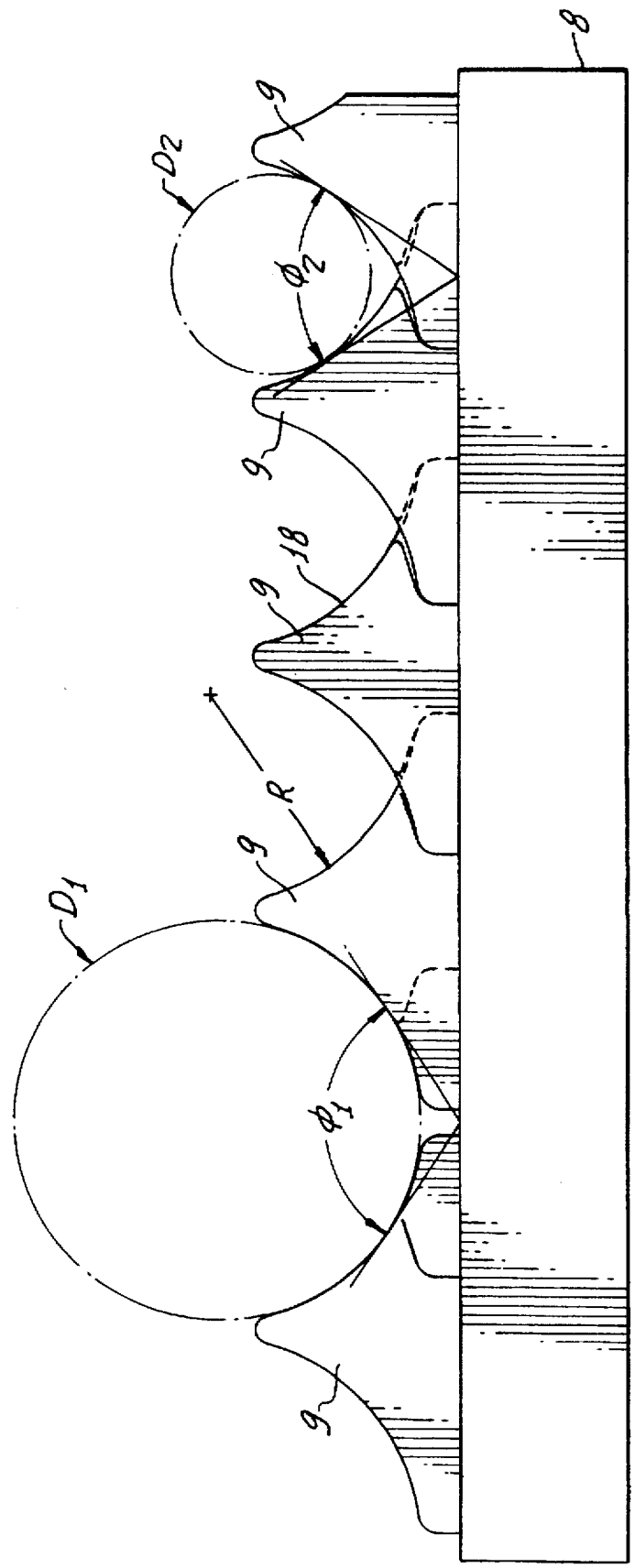
FIG. 3 shows a top view of a stacker bar assembly adjusted to push two different sizes of hot glass articles.

The preferred arcuate surface of pads 9 as shown in FIG. 3 have a radius of curvature R of about 2.25 inches. The preferred surfaces, when combined with the adjustable pad location and tongue-in-groove design, allow a single stacker bar assembly to reliably push a plurality of cylindrical glass articles varying in diameter from about 1.875 to 4 inches. In another embodiment, cylindrical glass articles ranging in diameter from about 4 to 8 inches can be accommodated. The adjoining arcuate surfaces form glassware nesting pockets which are more forgiving of positional and pushing misalignments than sawtooth configurations.

Shown dotted for clarity in FIG. 3 are two different glass articles, one having a diameter $D_1$ of four inches, the other having a diameter $D_2$ of two inches. Although stacker bar assemblies 7a are typically used to push a plurality of similarly sized hot glass articles, FIG. 3 illustrates the ability of the pads of the invention to handle hot glass articles having different diameters. The contact angles, $\theta_1$ and $\theta_2$, shown as about 113 degrees for the 4 inch diameter article and about 65.6 degrees for the two-inch diameter article, can be further varied by additional repositioning of the pads 9. The arcuate—cylindrical glass interface also provides a more conforming interface than a planar—cylindrical interface. Alternative embodiments may have arcuate surface portions having a radius of curvature ranging from about 1 to 500 inches, more typically about 2 to 10 inches.

In addition to the adjustable shape and materials of construction of the pads 9, serrating or controlling the surface finish of the contact surfaces 18 has also been found to be a significant variable when pushing and handling hot glass articles without damage. A surface roughness (of a planar or arcuate surface) of no smoother than about 125 μinches, RMS (average of root mean square measurements of the height of surface irregularities, measured in microinches) is preferred, more preferably no smoother than about 250 μinches, RMS average, but a smoother surface finish may also be tolerated for some applications, such as a surface finish of 64 μinches, RMS average. If an arcuate and serrated surface of a pad is used for contacting hot glass articles having a diameter of about 3 inches, the serrated surface is preferably formed by milling to create an average ridge to trough dimension in the range of about 0.050 to 0.060 inch. Other processes for producing a serrated and/or roughened surface include grinding, abrasion, and erosion. Serrated surfaces having an average ridge to trough dimension of at least about 0.001 inch or less may be used for other contact surface applications, but typically at least about 0.010 inch.

The serrated or other rough surface finish reduces the actual hot glass-graphite contact surface of the pad and thereby significantly improves stacker bar assembly performance by reduces the actual (microscopic) glass contacting area at contact sites and increasing the distribution of the actual contact areas at these sites when compared to smoother contact surfaces. The use of serrated or roughened surfaces on the pads of the invention is possible because the pads are substantially composed of a nonmetallic ceramic material. Unlike a serrated or rough stainless steel surface which may tend to increase mechanical damage to contacting hot glass articles when compared to a smoother stainless steel surface, the thermal and physical properties of a rough or serrated graphite or other ceramic surface seem to reduce thermal and mechanical damage when compared to smoother nonmetallic contact surfaces. Although the contact pads are typically maintained at elevated temperatures by being located near the annealing oven, the temperature of the pads is typically less than the hot glass articles, and it is believed the smaller actual contacting area of a serrated or rough contact surface reduces heat transfer from the hot glass articles to the nonmetallic pads, thereby reducing checking or other thermal stress damage. Furthermore, the arcuate shape plus rough/serrated surface plus nonmetallic composition is believed to better distribute mechanical loads to reduce mechanical damage.

Although some alternative embodiments have been described, other alternative embodiments are also possible. These include: using porous or ported pads which may be combined with a fluid flow through the pads (e.g., similar to air table handling); using separate contact surfaces on the pad instead of a continuous (radius of curvature) contact surface across the thickness of the pad (e.g., a top and a bottom contact surfaces on the pads); adding a heating element for heating the pad to elevate the temperature of the pad and minimize heat transfer from the hot glass articles, especially if a fluid is flowing near the pads; and attaching the pad to other glass handling or other equipment.

While the preferred embodiment of the invention has been shown and described, and some alternative embodiments also shown and/or described, changes and modifications may be made thereto without departing from the invention. Accordingly, it is intended to embrace within the invention all such changes, modifications and alternative embodiments as fall within the spirit and scope of the appended claims.

What is claimed is:

1. A stacker bar assembly for pushing hot glass articles into an annealing oven comprising:
   a support member; and
   a plurality of pads substantially composed of a nonmetallic material and attached to said support member, wherein each of said pads comprises a support connection surface, a tongue portion, a groove portion, and an arcuate glass-contact surface, and wherein the adjoining arcuate glass-contact surfaces of said pads form an adjustable tongue-in-groove surface capable of contacting a plurality of hot glass articles having different sizes.

2. The stacker bar assembly of claim 1 wherein at least a portion of said adjoining arcuate glass-contact surfaces has a surface roughness no smoother than about 125 microinches, root mean square average.

3. The stacker bar assembly of claim 1 wherein said pads are slidably attached to said support member.

4. The stacker bar assembly of claim 3 which also comprises:
   a conveyor for conveying said hot glass articles within an annealing oven; and
   means for translating said stacker bar assembly wherein said means for translating pushes said hot glass articles contacted by said stacker bar assembly onto said conveyor.

5. The stacker bar assembly of claim 1 which also comprises means for slidably attaching said pads to said support member, said means comprising:
   a threaded element capable of contacting said pad;
   a nut capable of mating with said threaded element; and
   a bias element tending to hold said nut in sliding contact with said support element.

6. The stacker bar assembly of claim 5 wherein said threaded element comprises a threaded bolt having a bolt head and wherein said pads also comprise a passageway having a ledge shaped and dimensioned to mate with said bolt head.

7. The stacker bar assembly of claim 1 wherein said glass articles are substantially cylindrical having diameters ranging from about 2 to 4 inches.

8. The stacker bar assembly of claim 1 wherein said pads are substantially composed of a ceramic material.

9. The stacker bar assembly of claim 8 where said ceramic material is a graphite material having a minimum compressive strength of about 10,000 psi.

10. The stacker bar assembly of claim 9 wherein said pads are substantially free of plastic resins or reinforcing fibers.

11. A pad for contacting hot glass articles, said pad capable of being attached to a support member and comprising:
   a support connection surface;
   a tongue portion;
   a groove portion; and
   a glass-contact surface wherein a multi-element contact surface is formed when the glass-contact surfaces of a plurality of pads are adjoiningly located, said multi-element contact surface being capable of contacting a plurality of hot glass articles.

12. The pad of claim 11 capable of being slidably attached to said support member.

13. The pad of claim 12 wherein said groove portion is shaped and dimensioned to adjustably mate with the tongue portion of an adjoining pad.

14. The pad of claim 11 wherein said pad is substantially composed of a ceramic material.

15. The pad of claim 14 substantially free of a plastic resin or fiber.

16. The pad of claim 15 wherein said ceramic material is a graphite having a flexural strength of at least about 4,000 psi and a coefficient of thermal expansion in the range of about $7 \times 10^{-6}$ to $8 \times 10^{-6}$ per ° Centigrade.

17. The pad of claim 16 wherein at least a portion of said contact surface has a surface roughness of at least about 64 microinches, root mean square average.

18. The pad of claim 16 wherein at least a portion of said contact surface comprises a serrated surface having an average ridge-to-trough dimension of at least about 0.001 inches.

19. The pad of claim 11 wherein at least a portion of said contact surface is arcuate.

20. The pad of claim 19 wherein at least a portion of said arcuate surface has a radius of curvature in the range of about 1 to 10 inches.

21. A nonmetallic pad for contacting hot glass articles comprising:
   a support surface capable of repositionable contact with a support member;
   a tongue portion;
   a groove portion; and
   a glass-contact surface wherein a multi-element contact surface is formed when a plurality of pads are adjoiningly located, said pads capable of being repositioned on said support member to contact a plurality of hot glass articles.

22. The pad of claim 21 wherein at least a portion of said contact surface is serrated and has an average ridge-to-trough dimension of at least about 0.050 inches.

23. A pad for contacting hot glass articles comprising:

a support surface capable of contact with a support member; and a glass-contact surface with at least a portion of said surface having a surface roughness of no less than about 125 mircoinches, root mean square average.

24. A pad for contacting hot glass articles comprising:

a support surface capable of contact with a support member; and a serrated glass-contact surface with at least a portion of said surface having an average ridge-to-trough dimension of at least about 0.001 inch.

25. The pad of claim 24 wherein said support surface is capable of slidable contact with said support member.

26. The pad of claim 24 wherein said average ridge-to-trough dimension is at least about 0.050 inch.

27. The pad of claim 23 wherein said portion of said glass-contact surface has a surface roughness of no less than about 250 mircoinches, root mean square average.

28. A pad for contacting hot glass articles comprising:

a support surface capable of being attached to a support member;

a tongue portion;

a groove portion; and a glass contact surface.

29. The pad of claim 28 substantially composed of a nonmetallic material.

30. The pad of claim 29 wherein said glass-contact surface is arcuate.

31. The pad of claim 30 wherein said nonmetallic material comprises a ceramic.

32. The pad of claim 30 wherein said nonmetallic material comprises graphite.

33. The pad of claim 29 wherein said glass-contact surface is serrated and has an average ridge-to-trough dimension of at least about 0.01 inch.

34. The pad of claim 27 substantially composed of a nonmetallic material.

35. The pad of claim 26 substantially composed of a nonmetallic material.

36. The pad of claim 34 wherein said nonmetallic material comprises graphite.

37. The pad of claim 35 wherein said nonmetallic material comprises graphite.

\* \* \* \* \*

UNITED STATES PATENT AND TRADEMARK OFFICE
CERTIFICATE OF CORRECTION

PATENT NO. : 5,741,343
DATED : April 21, 1998
INVENTOR(S) : Patrick H. Lloyd et al.

It is certified that error appears in the above-indentified patent and that said Letters Patent is hereby corrected as shown below:

Column 4, line 22, after "drawings" delete "15a".

Column 6, line 10, after "arcuate" delete "surface" and insert -- surfaces --.

Column 6, line 59, delete "pad" and insert -- pads --.

Column 6, line 61, delete "reduces" and insert -- reducing --.

Column 8, Claim 18, line 48, delete "inches" and insert -- inch --.

Column 8, Claim 22, line 67, delete "inches" and insert -- inch --.

Signed and Sealed this

Twenty-eighth Day of July, 1998

Attest:

BRUCE LEHMAN

Attesting Officer

Commissioner of Patents and Trademarks